Dec. 15, 1931.　　　　　G. W. BLAIR　　　　　1,837,011

FASTENER

Filed Oct. 29, 1926

Inventor
Georg W. Blair
By Eugene M. Giles
Attorney.

Patented Dec. 15, 1931

1,837,011

UNITED STATES PATENT OFFICE

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

FASTENER

Application filed October 29, 1926. Serial No. 144,940.

My invention relates to fasteners of the type comprising opposed series of fastener elements which are mounted on the edges of the parts to be connected and are adapted to be interlocked and released by movement of a cam member or slider therealong.

The principal objects of my invention are to provide a quick operating fastener wherein the elements may be made of comparatively thin sheet metal; to afford a wide extent of interlocking; to arrange the cam member so that it slides on the outer extremities or heads of the elements; to extend the lateral edges of the slider so as to prevent the latter from slipping between the elements; to provide an improved mounting for the fastener elements; to reduce the thickness of the mounting portion of the structure; to minimize the amount of metal which is exposed; to insure proper alignment and accurate spacing of the elements; to hold the elements securely against displacement; and in general, to provide a quick operating fastener of improved appearance, and which may be easily manufactured.

Figure 1:
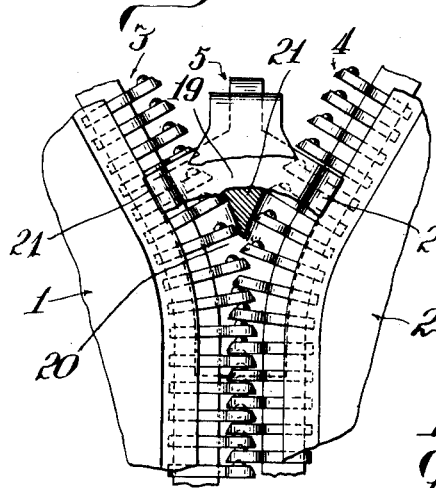
Fig. 1 is a front view of sections of the opposed series of elements at the point of interlocking and with portions of the operating member or slider broken away.

Referring to the drawings, the reference numerals 1 and 2 indicate fragmentary portions of the parts which are to be connected by the fastener, and 3 and 4 the two series of fastener elements which are secured respectively to the parts 1 and 2 and adapted to be interlocked and released by the cam member or slider 5 which is mounted on and adapted to operate along the two series of elements 3 and 4. The elements 3 and 4 are alike, each consisting of a plate like member which may be of comparatively thin sheet metal and is suitably formed, with an elongated loop shaped shank 6 having a head portion 7 extending across the end and projecting laterally at each side of the shank 6, thereby affording a rounded seat 8 at each side where the shank joins the head 7. The outer extremity of the head 7 is preferably formed with a straight edge 9, preferably beveled as shown, and just back of this edge 9 the head 7 is formed on one side with a transverse row of projections 10 which are punched to form corresponding recesses 11 in the other side of the head, three projections and recesses being shown which affords a center recess and projection and a projection and recess at each side thereof and adjacent respectively the lateral extremities of the head 7.

Figure 2:
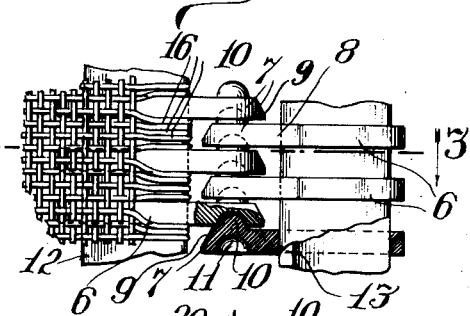
Fig. 2 is an enlarged front view of a number of interlocked elements.
Figure 3:
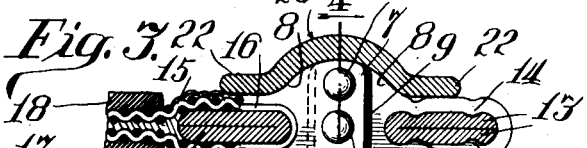
Fig. 3 is a view taken on the line 3—3 of Fig. 2.
Figure 4:
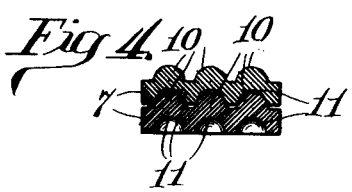
Fig. 4 is a sectional view of a pair of interlocked elements, taken on the line 4—4 of Fig. 3.

For assembling the elements 3 and 4 a flat stringer 12 is threaded through the apertures of the elongated loop shaped portions 6 of the elements, said stringer being preferably composed of a tape which is doubled over as indicated at 13 in Fig. 3, and when the elements are arranged in proper spaced relation on the stringer the opposite sides of each loop portion 6 may be indented as at 14, to lock the elements securely in place on the stringer, said indentations being preferably arranged as shown in Fig. 3, adjacent the respective edges of the tape or stringer so that each elongated loop is locked or keyed on the stringer at spaced points. For mounting the assembled elements 3 or 4 and stringer 12 on the parts which are to be connected by the fastener, a tape 15 is preferably employed having a number of center threads drawn or omitted to leave bare intermediate cross threads 16 and the heads 7 of the series of elements 3 or 4 are inserted or filtered between said cross threads 16 as shown particularly in Figs. 2 and 3 and the side portions of the tape are folded together and secured in this position by adhesive, stitching, or in any other convenient manner. The parts 1 and 2 may themselves be formed with omitted threads and the assembled elements 3 or 4 and stringer 12 secured directly thereto in the manner above described, but I prefer to use the tape 15 and then fasten the overlapped portions of the tape 15 to the parts 1 and 2 in any convenient manner. In many cases, as for example in overshoes and the like, where the parts 1 and 2 are composed of a facing and lining, the mounting of the assembled fastener elements may be conveniently accomplished by locating the overlapped portions of the tape 15 between the facing and lining which are represented respectively at 17 and 18 in Fig. 3 and securing the tape portions therebetween by adhesive, stitching or in any other convenient manner. With this construction the facing and lining together make up a thickness about the same as the stringer 12 and the thickness of the stringer 12 and the overlying portions of the tape 15 is therefore about the same as the thickness of the combined lining and facing 17 and 18 and the intermediate overlapped portions of the tape 15, so that when the edges of the facing and lining 17 and 18 are brought up close to the outer edge of the stringer 12, a continuous structure of substantially uniform thickness is provided clear up to the enlarged heads 7 of the elements.

The slider 5 for interlocking and releasing the fastener elements 3 and 4, is of substantially the usual construction, comprising front and rear plates 19 and 20 respectively with a wedge shaped member 21 between their upper ends forming a pair of divergent channels merging into a single channel at the lower end and serving upon movement in one direction to direct the series of elements 3 and 4 inwardly at an angle and thereby nest the elements on the one side between the elements on the other side so that the projections 10 of each element engage in recesses 11 of an opposed element and upon movement of the slider in the other direction the series of elements 3 and 4 are spread apart and withdrawn from engagement. The slider however, does not embrace the elements throughout their entire length as has been the custom heretofore, but the plates 19 and 20, which are rounded intermediately somewhat as shown in Fig. 3, to conform to the rounded lateral extremities of the heads 7, have inturned portions engaging in the seats 8 of the elements 3 and 4, and these inturned portions terminate in flanges 21 and 22 along the lateral edges of the plates 19 and 20 respectively which extend outwardly part way over the stringers 12 at each side a sufficient distance so that the slider cannot be disengaged from the assembled fastener by slipping between, or cutting through the open spaces between, adjoining fastener elements.

Figure 5:
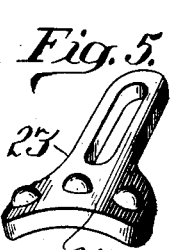
Fig. 5 is a perspective view of a modified form of interlocking element.

In Fig. 5 I have shown a modified form of fastener element 23, which is similar to that shown in Figs. 1 to 4 inclusive, except that the head portion 24 thereof is rounded from side to side and this gives greater security against side slipping and facilitates lateral bending of the fastener.

Figure 8:
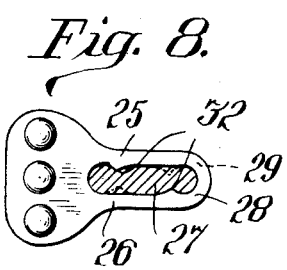
Fig. 8 is a view similar to Fig. 6, showing the element as it appears when mounted.
Figure 9:
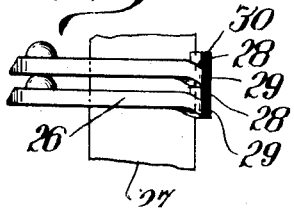
Fig. 9 is a side view of several of the elements of Fig. 6, mounted on a tape or stringer.
Figure 10:
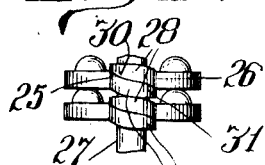
Fig. 10 is a view looking at the rear ends of the elements of Fig. 9.
Figure 7:
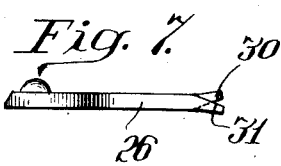
Fig. 7 is an edge view of the element of Fig. 6.

Instead of forming the fastener with a closed loop such as shown at 6 in Figs. 1, 2, 3 and 5, the fastener element may be provided with a pair of arms 25 and 26 which are clamped against the sides of the stringer 27 as shown in Figs. 8, 9 and 10 and have the ends bent around the rear edge of the stringer as shown in said figures. The arms 25 and 26 preferably have the ends offset and overlapped one above the other as shown at 28 and 29 respectively, the ends being reversely beveled as at 30 and 31 respectively to afford a proper fit as shown in Figs. 9 and 10, and this overlapping of the ends affords a double thickness at the extremities of the arms to insure proper spacing of the elements on the stringer 27.

Figure 6:
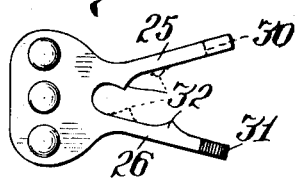
Fig. 6 is a plan view of another modified form of element before mounting.

Instead of indenting the arms 25 and 26 after mounting the lock the elements securely in place on the stringer, each arm may be formed with one or more projections 32 which engage in the stringer and hold the elements securely against displacement. One projection on each arm as shown in full lines in Figs. 6 and 8 may be employed and arranged respectively to engage near the opposite edges of the stringer or each arm may have additional projections as indicated by dotted lines in said figures and arranged in somewhat staggered relation as shown so that the projections on opposite sides of the stringer are not exactly in line.

While I have shown and described my invention in a preferred form, I am aware that various changes and modifications may be made without departing from the principles of my invention, the scope of which is to be determined by the appended claims.

I claim as my invention:

1. In a fastener of the class described, the combination of opposed series of fastener elements, each of said elements comprising an elongated mounting shank with a plate like portion extending across the end thereof, said plate like portion being provided with a rounded center locking projection and recess in line with the shank and a similar locking projection and recess at each side of the center projection and recess, and a slider operable along the two series of fastener elements for interlocking and releasing same.

2. In a fastener of the class described, the combination of a stringer, and a fastener element having a mounting loop embracing the stringer, said loop being indented into the stringer to lock the element in place thereon.

3. In a fastener of the class described, the combination of a fastener element having an elongated mounting loop and a flat stringer engaged through the mounting loop, said mounting loop being indented at opposite sides for locking the element on the stringer.

4. In a fastener of the class described, the combination of opposed series of fastener elements each of said elements comprising a head with a reduced mounting shank and locking means extending across the head beyond the shank, and a slider comprising opposed wings having inturned portions engaging the elements adjacent the juncture of the heads and mounting shanks and said opposed wings having substantially parallel flanges along their lateral edges which embrace portions of the mounting shanks therebetween, said slider being operable along the two series of elements for interlocking and releasing same.

GEORGE W. BLAIR.